3,636,138
PROCESS FOR IMPACT MODIFICATION OF VINYL HALIDE POLYMERS AND IMPACT MODIFIERS AND VINYL HALIDE BLENDS PRODUCED THEREWITH
Ludwig A. Beer, Agawam, Mass., assignor to Monsanto Company, St. Louis, Mo.
No Drawing. Filed Aug. 5, 1968, Ser. No. 749,941
Int. Cl. C08f *19/08, 41/12, 29/24*
U.S. Cl. 260—876 R                          19 Claims

ABSTRACT OF THE DISCLOSURE

A novel graft copolymer is prepared utilizing a diene rubber substrate and two different interpolymers forming a graft superstrate. Initially the diene rubber is admixed with a polymerizable monomer formulation containing a monovinylidene aromatic hydrocarbon and an alkyl alkacrylate which is grafted thereonto. This graft copolymer is admixed with a second polymerizable monomer formulation containing a monovinylidene aromatic hydrocarbon and an unsaturated nitrile which is grafted thereonto to form a composite graft copolymer having a shell rich in the nitrile interpolymer. Blends of such composite graft copolymers with vinyl chloride polymers having a high degree of transparency are also disclosed.

BACKGROUND OF THE INVENTION

As is well known, blends of various polymers with rubbers often afford significant advantages in providing compositions having enhanced toughness to render them suitable for many applications. Such impact modification is widely employed in connection with styrene, styrene/acrylonitrile and vinyl chloride polymers. Although some benefit may be obtained by mechanical blending with the unmodified rubber, it has generally been necessary to select a rubber of a composition compatible with the matrix polymer or to use a compatibilizing agent or to graft onto the rubber substrate a polymer which would improve adhesion to the matrix polymer. In many instances, the grafted polymer has had the same composition as the matrix polymer.

In the manufacture of impact modified vinyl chloride polymers, graft copolymers of chemical composition distinct from the vinyl chloride have been widely employed as have grafts of vinyl chloride onto olefin polymers such as chlorinated polyethylene and ethylene/vinyl acetate. An impact modifier formed by polymerizing a mixture of styrene and acrylonitrile type monomers onto a diene rubber is disclosed in Hayes U.S. Pat. No. 2,802,809, granted on Aug. 13, 1957. An impact modifier formed by polymerizing a mixture of styrene and alkyl methacrylate type monomers onto a diene rubber substrate is disclosed in Feuer U.S. Pat. No. 2,857,360, granted Oct. 21, 1958. More recently, polymerization of a mixture of styrene, acrylonitrile and methyl methacrylate monomers onto a diene rubber substrate has been proposed in Saito et al. U.S. Pat. No. 3,287,443, granted Nov. 22, 1966. In Himei et al. U.S. Pat. No. 3,288,886, granted Nov. 29, 1966, there is proposed still another type of graft copolymer provided by first polymerizing styrene in the presence of the rubber followed by polymerization of methyl methacrylate.

In order to achieve optimum properties, it is important that the graft superstrate exhibit excellent bonding or adhesion to the matrix. In addition, there has been a growing desire to provide impact modified polymer blends which would exhibit substantial transparency resulting in many efforts to match the refractive index of the rubber with that of the matrix polymer and recently to graft the rubber with a polymer having a refractive index to the opposite side of that of the matrix polymer from that of the rubber so that the composite of the refractive indices of the rubber and graft superstrate would equal that of the matrix polymer. For this reason, alkyl methacrylates, and particularly methyl methacrylate, have been widely proposed as a monomer for grafting a butadiene rubber substrate to provide a modifier for vinyl chloride polymers. However, methyl methacrylate does not have so high a degree of polarity as is desirable to achieve optimum adhesion to the vinyl chloride polymer matrix.

The more polar combination of styrene and acrylonitrile does not produce the refractive index required for transparent blends except in compositional ratios which are not optimum from the standpoint of impact modification. The aforementioned Saito et al. patent proposes the grafting of a terpolymeric substrate onto the diene rubber to obtain some balance in the properties of impact modification and transparency.

It is an object of the present invention to provide a method for making a novel graft copolymer having a diene rubber substrate and a superstrate including monovinylidene aromatic hydrocarbon, unsaturated nitrile and alkyl alkacrylate monomers.

It is also an object to provide such a method which is facile and highly effective and which can be utilized to product a graft copolymer having an optimum balance of properties when blended with vinyl halide polymers to provide a transparent blend.

Still another object is to provide novel vinyl halide polymer blends exhibiting good impact resistance and transparency and which are advantageously employed for packaging and other applications where toughness and transparency are desired.

SUMMARY OF THE INVENTION

It has now been found that the foregoing and related objects can be readily attained by a process in which there is formed an admixture of a diene rubber-substrate and a polymerizable monomer formulation containing a monovinylidene aromatic hydrocarbon monomer and an alkyl alkacrylate monomer. The admixture is subjected to polymerization conditions to effect interpolymerization of the monomers and grafting of at least a substantial portion of the interpolymer formed onto the diene rubber substrate, thereby forming a graft copolymer. An admixture is then formed of the graft copolymer and a second polymerizable formulation containing a monovinylidene aromatic hydrocarbon monomer and an unsaturated nitrile monomer, and this admixture is then subjected to polymerization conditions to effect interpolymerization of the monomers and grafting of at least a substantial portion of the interpolymer formed onto the graft copolymer. As a result, a composite graft copolymer is formed which has a shell relatively rich in the interpolymer formed by the mixture of the monovinylidene aromatic hydrocarbon and unsaturated nitrile.

Although the graft copolymer thus formed may be utilized per se for various applications as a rubber modified material such as those where ABS materials are employed, it has especial utility as an impact modifier for other polymers. By proper selection of the chemical composition of the rubber substrate and of the two interpolymers and the amounts thereof grafted onto the rubber substrate, the apparent refractive index of the composite graft copolymer can be closely matched to the refractive index of the matrix polymer to provide a transparent composition having highly desirable impact strength, good chemical resistance and a balance of other properties. Such impact modification has been especially useful in the manufacture of vinyl halide polymer blends for packaging and other applications.

Although the theory of operation is not fully understood, it is believed that the mixture of styrene-type and alkacrylate monomers swells the rubber particle and produces grafted interpolymer within the rubber particle as well as on the surface thereof with the chains on the surface tending to orient themselves relatively closely adjacent thereto. The subsequent polymerization of the more polar mixture of styrene-type and nitrile monomers is believed to produce polymer chains which graft primarily on the surface of the rubber particle and the polymer chains tend to project outwardly from the surface of the rubber particle substrate, particularly when fused within a relatively polar matrix for which the nitrile interpolymer has greater affinity. As a result of this polarity gradient from the surface of the rubber particle to the shell of the graft copolymer, the highly polar nitrile interpolymer tends to be concentrated in the shell so as to provide highly desirable adhesion to a polar matrix.

DESCRIPTION OF THE PREFERRED EMBODIMENTS

As previously indicated, the novel composite graft copolymer of the present invention is comprised of a rubbery diene polymer substrate and a superstrate formed of two different interpolymers of a monovinylidene aromatic hydrocarbon monomer with an alkyl alkacrylate and with an unsaturated nitrile monomer. Although the polymerization blend may be used per se particularly when there is a substantial amount of ungrafted interpolymers formed, it will generally be employed in a blend with another polymer such as vinyl chloride. The characteristics and utility of the graft copolymer will vary depending upon various factors of composition and the technique of preparation as will be pointed out in detail hereinafter.

Nature of the rubber substrate

The rubbers onto which the interpolymers may be grafted during the polymerization in the presence thereof to provide the substrate of the graft copolymer are diene rubbers or mixtures of diene rubbers, i.e., any rubbery polymers (a polymer having a second order transition temperature not high than 0° centigrade, preferably not higher than —20° centigrade, as determined by ASTM Test D-746-52T) of one or more conjugated 1,3-dienes, e.g., butadiene, isoprene, piperylene, chloroprene, etc. Such rubbers include homopolymers and interpolymers of conjugated 1,3-dienes with up to about 45 percent by weight of one or more copolymerizable monoethylenically unsaturated monomers, such as monovinylidene aromatic hydrocarbons (e.g., styrene; an aralkylstyrene, such as the o-, m-, and p-methylstyrenes, 2,4-dimethylstyrene, the ar-ethylstyrenes, p-tertbutylstyrene, etc.; an alpha-alkyl-styrene, such as alpha-methylstyrene, alpha-ethylstyrene, alpha-methyl-p-methylstyrene, etc.; vinyl naphthalene, etc.); arhalo monovinylidene aromatic hydrocarbons (e.g., the o- m-, and p-chlorostyrenes, 2,4-dibromostyrene, 2-methyl-4-chlorostyrene, etc.); acrylonitrile; methacrylonitrile; alkyl acrylates (e.g., methyl acrylate, butyl acrylate, 2-ethylhexyl acrylate, etc.), the corresponding alkyl methacrylates; acrylamides (e.g., acrylamide, methacrylamide, N-butyl acrylamide, etc.); unsaturated ketones (e.g., vinyl methyl ketone, methyl isopropenyl ketone, etc.); alpha-olefins (e.g., ethylene, propylene, etc.); pyridines; and the like.

Although the rubber may contain up to about 2 percent of a cross-linking agent, based upon the weight of the rubber-forming monomer or monomers, excessive cross-linking is generally undesirable and may present problems in the graft polymerization reaction. Of particular concern is that excessive cross-linking can result in loss of the rubbery characteristics. The cross-linking agent can be any of the agents conventionally employed for cross-linking diene rubbers, e.g., divinylbenzene, diallyl maleate, diallyl fumarate, diallyl adipate, allyl acrylate, allyl methacrylate, diacrylates and dimethacrylates of polyhydric alcohols, e.g., ethylene glycol dimethacrylate, etc.

A preferred group of rubbers are those consisting essentially of 65 to 100 percent by weight of butadiene and/or isoprene and up to 35 percent by weight of a monomer selected from the group consisting of unsaturated nitriles (e.g., acrylonitrile, methacrylonitrile), unsaturated carboxylates (e.g., acrylates, methacrylates) and monovinylidene aromatic hydrocarbons (e.g., styrene, chlorostyrenes, etc.) or mixtures thereof. Particularly advantageous substrates for preparing transparent vinyl chloride blends are interpolymers of 90 to 70 percent by weight butadiene and 10 to 30 percent by weight of styrene.

Various techniques are customarily employed for polymerizing the monomers of the rubber including mass, suspension and emulsion polymerization. Emulsion polymerization can be used to produce a latex emulsion which is useful as the base for emulsion polymerization of the graft copolymer.

When transparency is not desired, the average particle size of the rubber substrate prior to grafting may vary from as little as 0.01 microns to as large as about 10.0 microns, and preferably about 0.08 to 2.0 microns for optimum benefit to impact properties. If a transparent composition is desired, the average particle size should not be larger than about 0.4 micron and preferably about 0.1 to 0.3 micron. However, it will be appreciated that minor amounts of the rubber substrate may be of larger particle size even when a transparent composition is desired albeit with a tendency towards haze.

When a diene rubber latex is employed having a smaller average particle size range by chemical or mechanical means. Acidulation and freeze-thaw techniques are widely employed for this purpose, and more recently pressure agglomerating techniques have been utilized commercially.

The interpolymers of the superstrate

The monovinylidene aromatic hydrocarbon in the two interpolymers may be the same or it may vary to alter the properties of the composition. For example, chlorostyrene may be employed in the interpolymer with the unsaturated nitrile to increase the polarity of the shell interpolymer or alphamethyl styrene may be employed in one of the interpolymers to increase the heat distortion temperature of the graft copolymer. Moreover, different styrene-type compounds may be desirable to tailor the refraction index of the composite graft copolymer to the refractive index of the matrix polymer with lesser amounts of relatively non-polar styrene monomers. Similarly, the particular unsaturated nitrile and alkyl alkacrylate selected will depend upon the interplay thereof when a transparent blend is sought.

Exemplary of the monovinylidene aromatic hydrocarbons which may be used in the interpolymers are styrene; alpha-alkyl monovinylidene monoaromatic compounds, e.g. alpha-methylstyrene, alpha-ethylstyrene, alpha-methylvinyltoluene, alpha-methyl dialkylstyrenes, etc.; ring-substituted alkyl styrenes, e.g. vinyl toluene, o-ethylstyrene, p-ethylstyrene, 2,4-dimethylstyrene, etc.; ring-substituted halostyrenes, e.g. o-chlorostyrene, p-chlorostyrene, o-bromostyrene, 2,4 - dichlorostyrene, etc.; ring-alkyl, ring-halo-substituted styrenes, e.g. 2-chloro-4-methylstyrene, 2,6 - dichloro - 4 - methylstyrene, etc.; vinyl naphthalene; vinyl anthracene, etc. The alkyl substituents generally have 1 to 4 carbon atoms and may include isopropyl and isobutyl groups. If so desired, mixtures of such monovinylidene aromatic monomers may be employed. Styrene and alkylstyrenes are preferred for most applications, and styrene has been most beneficially employed in obtaining impact modifiers for transparent vinyl chloride blends.

Exemplary of the unsaturated nitriles which may be used in the interpolymers are acrylonitrile, methacrylonitrile, ethacrylonitrile, alphamethylene glutaronitrile and mixtures thereof. Acrylonitrile and methacrylonitrile are preferred and acrylonitrile is particularly advantageously employed for transparent blends with polyvinyl chloride.

Generally, the alkyl groups of the alkyl alkacrylates will have from 1 to 15 carbon atoms and preferably 1 to 8 carbon atoms in their chain. The alkacrylic acid from which the ester is derived will normally have an alkyl chain of 1 to 6 carbon atoms and preferably 1 to 4 carbon atoms. Exemplary compounds are methyl methacrylate, ethyl methacrylate, etc.; methyl ethacrylate, ethyl ethacrylate, etc.

Minor amounts of other copolymerizable monomers may also be included in the interpolymer when so desired. Exemplary of said monomers are acrylic acid, alkacrylic acids, acrylate esters, fumarates, maleates, acrylamide, methacrylamide, etc. Such additional monomers should comprise not more than 15 percent by weight of either interpolymer, and their effect upon the refractive index of the composite graft copolymer must be considered when a transparent impact modifier is being sought as well as their effect upon the physical properties thereof.

Generally, the monovinylidene aromatic hydrocarbon in the interpolymer with the alkyl alkacrylate will comprise 40 to 75 percent bby weight of the interpolymer and the alkyl alkacrylate will comprise 25 to 60 percent by weight thereof. Desirably 45 to 65 percent by weight of the interpolymer will be the monovinylidene aromatic hydrocarbon. For transparent polyblends with vinyl chloride using a butadiene/styrene substrate, the preferred interpolymers contain 60 to 45 percent by weight of styrene and 40 to 55 percent methyl methacrylate.

Generally, the monovinylidene aromatic hydrocarbon in the interpolymer with the unsaturated nitrile will comprise 60 to 85 percent by weight thereof and the unsaturated nitrile will comprise 15 to 40 percent by weight thereof. Desirably, the unsaturated nitrile will comprise 20 to 35 percent by weight. For transparent polyblends with vinyl chloride using a butadiene/styrene rubber substrate, the preferred interpolymer contains 70 to 80 percent by weight styrene and 20 to 30 percent by weight acrylonitrile, or less desirably methacrylonitrile.

As will be readily appreciated, the ratio of the grafted interpolymers to the rubber substrate may vary widely and is generally within the range of 0.5 to 2.0 parts by weight of the combined interpolymers per part by weight of rubber substrate. The preferred composite graft copolymers have a superstrate:substrate ratio of about 0.8–1.6:1.0 so as to obtain a balance between preservation of the rubbery character of the substrate and the desired chemical adhesion and transparency.

Similarly, the weight ratio of the nitrile interpolymer to the alkacrylate interpolymer may vary fairly widely, particularly when a transparent impact modifier is not being sought. However, since it is a prime object of the present invention to provide a composite graft copolymer having a shell which is relatively polar for optimum adhesion to the matrix polymer, the weight ratio of the nitrile interpolymer to alkacrylate interpolymer will be about 0.3–2.0:1.0, and preferably about 0.5–1.2:1.0 When a transparent impact modifier for use with vinyl chloride polymers is sought and the interpolymers are of styrene/methyl methacrylate and styrene/acrylonitrile, the optimum ratio is about 0.5–1.0:1.0.

The graft polymerization processes

In both interpolymerization reactions, the polymerizable monomer formulation is admixed with the rubber substrate (or grafted rubber substrate) and subjected to polymerization conditions. Although mass polymerization and suspension polymerization, or the combination thereof, may be used to effect such graft polymerization, emulsion polymerization has been found particularly advantageous for the present invention and affords a highly desirable transparent impact modifier for other polymers.

In the emulsion polymerization process, the monomers and rubber substrate are emulsified in water by use of suitable emulsifying agents such as fatty acid soaps, alkali metal or ammonium soaps of high molecular weight alkyl or alkaryl sulfates and sulfonates, mineral acid salts of long chain aliphatic amines, etc. Emulsifying agents which have proven particularly advantageous are sodium oleate, sodium palmitate, sodium stearate and other sodium and potassium soaps The amount of water in which the monomers and rubber substrate are emulsified may vary depending upon the emulsifying agent, the polymerization conditions and the particular monomers. However, it should be appreciated that the ratio of the emulsifier to water will tend to affect the size of the dispersed particles. Normally, the admixture will be somewhat basic, i.e., about 7.8 to 9.5.

If so desired, the aqueous latex formed in the emulsion polymerization of the rubber substrate may provide the aqueous medium into which the monomers are incorporated with or without additional emulsifying agents, etc. However, the rubber may be dissolved in the monomers and the mixture emulsified, or a latex thereof may be separately prepared. Generally, the emulsifying agent added during polymerization of the diene monomer formulation to produce a rubber latex useful for the present invention is in an amount less than about 4.0 percent by weight based upon the weight of the monomers. Sometimes the emulsifying agent which has been added for the polymerization of the rubber substrate may be sufficient for emulsification of the monomers for the first graft polymerization reaction. However, in the interests of obtaining latex stability and greater control over the emulsion and particle size, small amounts of emulsifying agent may be added during the graft polymerization reaction or between the first and second polymerization reactions. However, such addition should be closely controlled so as not to deleteriously affect the particle size of the dispersed phase.

Although actinic radiation and both water-soluble and monomer-soluble peroxy-type catalysts with or without a reducing agent to form a redox system may be employed for both graft polymerization reactions, it has been found highly advantageous to use a redox system with a monomer-soluble catalyst for the alkacrylate monomer polymerization step and a redox system with a water-soluble catalyst for the nitrile monomer polymerization step. Redox systems offer the advantage of permitting the use of slower catalysts with equivalent conversion periods Exemplary of the water-soluble peroxy catalysts are the alkali metal peroxides; the alkali metal and ammonium persulfates, perborates, peracetates and percarbonates; and hydrogen peroxide. Exemplary of the monomer-soluble peroxy and perazo compounds are di-tert-butyl peroxide,
di-benzoyl peroxide,
di-lauroyl peroxide,
di-oleyl peroxide,
di-toluyl peroxide,
di-tert-butyl diperphthalate,
di-tert-butyl peracetate,
di-tert-butyl perbenzoate,
dicumyl peroxide,
di-tert-butyl peroxide,
di-isopropyl peroxide carbonate,
2,5-dimethyl-2,5 di-(tert-butylperoxy) hexane,
2,5-dimethyl-2,5-di(tert-butylperoxy)hexyne-3,
di-tert-butyl hydroperoxide,
cumene hydroperoxide,
p-menthane hydroperoxide,
cyclopentane hydroperoxide,
diisopropylbenzene hydroperoxide,
p-tert-butylcumene hydroperoxide,
pinane hydroperoxide,
2,5-dimethylhexane-2,5-dihydroperoxide,
etc., azo-di-isobutyronitrile, and mixtures thereof.

The catalyst is generally included within the range of 0.001 to 1.0 percent by weight, and preferably on the order of 0.005 to 0.5 percent by weight of the polymerizable material, depending upon the monomers and the desired polymerization cycle.

Exemplary of the reducing agents which may be employed are alkali metal and ammonium sulfites, hydrosulfites, metabisulfites, thiosulfates, sulfinates, formaldehydesulfoxylates or ascorbic acid, dioxyacetone, dextrose, etc. Various other reducing agents for redox systems may also be employed.

The amount of reducing agent will be about 0.001 to 1.0 percent by weight, and preferably on the order of 0.005 to 0.5 percent by weight, of the polymerizable monomer formulation, depending on the catalyst and the amount thereof.

Minute amounts of activators or promoters such as ferrous salts and copper salts may be included. Molecular weight regulators may be included in the emulsion formulation for the graft polymerization reaction so as to control the molecular weight and achieve the desired properties. Exemplary of such molecular weight regulators are the higher alkyl mercaptans and terpenes, specifically N-dodecyl mercaptan, tert-dodecyl mercaptan, terpinolene, di-limonene, etc.

In accordance with a preferred process, the polymerizable monomers are added to the latex in relatively small amounts, and preferably continuously, over an extended period of time so as to minimize the amount of copolymerizable monomers in the latex at any time. By limiting the amount of unreacted monomer present in the latex and particularly during the initial phase of polymerization, it has been found that grafting of the monomers upon the substrate can be favored. Similarly, it has been found that an excess of catalyst during the initial phases of the polymerization reaction tends to favor the grafting reaction.

The particular polymerization conditions employed will vary with the monomer formulation and the catalyst. Generally, the reaction will increase with an increase in temperature although a limiting factor is possible deterioration in product properties and also a tendency to produce problems in maintaining latex instability. Generally, temperatures of about 30 to 100° centigrade and pressures of about 0–50 p.s.i.g. have been found suitable for a fairly efficient graft polymerization reaction. If so desired, an inert atmosphere may be employed over the polymerizing latex.

After the polymerization reaction has proceeded to the desired degree of conversion of the monomers, which will normally be more than 90 percent, any unreacted monomers should be stripped. Retention of any significant amount of the alkacrylate monomer during the nitrile polymerization step is undesirable since it will tend to reduce the percentage of the nitrile monomer in the shell of the composite graft polymer. After the nitrile polymerization, the graft copolymer may be recovered by freeze or salt coagulation in the form of a crumb or by spray drying, and is washed for subsequent processing. Alternatively, the latex may be combined with a latex of the matrix polymer and coagulated or spray dried therewith. The amount of ungrafted interpolymers produced by the graft polymerization reactions will vary with the efficiency of the graft reactions and the ratio of monomer formulations to rubber substrate (or grafted rubber substrate) in the charge. By these factors, the amount of ungrafted interpolymers will normally vary within the range of about 5 to 150 parts per 100 parts of graft copolymer with the higher ratios being produced by high monomer/rubber charges. The amount of ungrafted interpolymer should be less than 30 parts per 100 parts of graft copolymer, and preferably less than 20 parts, when the graft copolymer is to be utilized as an impact modifier for another polymer.

Determination of the apparent refractive index of the graft copolymer

The apparent refractive index of the composite graft copolymer may be determined by actual test measurement in accordance with conventional procedures. However, it has been found that the apparent refractive index usually can be approximated from known refractive indices of the components without the necessity for actual test measurements and with a reasonably high degree of accuracy.

In this method of calculation, the known refractive indices of the particular component, i.e., the rubber substrate or the interpolymers, are utilized. The refractive index of the particular component is multiplied by the number of weight units and the average for the sum of the three components is then obtained. This average represents the apparent refractive index of the entire composition comprising both the composite graft copolymer and any ungrafted interpolymers which are produced simultaneous therewith.

Generally, refractive indices for the rubber substrates and for the interpolymers are readily available from published literature. For example, the change in refractive index of styrene/acrylonitrile copolymers is essentially linear with changes in composition in a styrene/acrylonitrile range of about 80:20 to 40:60 so that a simple graphic representation provides a facile method of determining the refractive index for the copolymer in any given composition. Similar graphic representations are available for styrene/methyl methacrylate polymers.

Polymeric blends

As previously indicated, the composite graft copolymers of the present invention may be blended with other polymers to impart impact resistance thereto. Since it is the object of the present invention to provide a shell which is relatively rich in a polar monomer (i.e., the unsaturated nitrile), the matrix polymer should be one which is relatively polar in character so as to obtain the intended optimum adhesion between the two phases. In addition, the matrix polymer and the interpolymers of the superstrate must be sufficiently physically compatible to achieve a stable system.

Among the polymers which may be modified by the graft copolymers of the present invention are interpolymers of monovinylidene aromatic hydrocarbons and monomers such as the unsaturated nitriles and/or (alk) acrylates; and vinyl halide polymers such as vinyl chloride, vinyl chloride/vinyl acetate, vinyl chloride/vinylidene chloride, chlorinated polyvinyl chloride and graft copolymers of vinyl chloride onto suitable substrates such as chlorinated polyethylene, ethylene/vinyl ester copolymers, ethylene/propylene terpolymers, etc.

The graft copolymers are most advantageously utilized with vinyl halide polymers, and particularly those of vinyl chloride and less desirably those of vinyl fluoride. Vinyl chloride is the preferred vinyl halide monomer and may be used alone or in combination with vinyl fluoride and/or other ethylenically unsaturated compounds copolymerizable therewith. In the case of interpolymers with other ethylenically unsaturated compounds, the amount of comonomer generally should not exceed about 25 percent by weight of the interpolymer, and preferably should not exceed 15 percent by weight thereof.

Ethylenically unsaturated monomers which may be interpolymerized with the vinyl halides include vinylidene halides such as vinylidene chloride; vinyl esters such as vinyl acetate; acrylic and alpha-alkyl acrylic acids such as acrylic and methacrylic acids; the alkyl esters of such acrylic and alkyl-acrylic acids such as methyl acrylate, ethyl acrylate, methyl methacrylate; amides of acrylic and alkyl-acrylic acids such as acrylamide, methacrylamide; unsaturated nitriles such as acrylonitrile, methacrylonitrile, ethacrylonitrile; monovinylidene aromatic hydrocarbons such as styrene and alpha-alkyl styrenes; dialkyl esters of maleic acid such as dimethyl maleate and the corresponding fumarates; vinyl alkyl ethers and ketones; ethylene; and other ethylenically unsaturated compounds copolymerizable with the vinyl halides. Mixtures of compounds exemplified by the foregoing materials may also be used to form the vinyl halide polymer.

The method used to prepare the vinyl halide resins may be any which is commonly practiced in the art; the polymerization may be effected en masse, in solution or with the monomer in an aqueous dispersion. From the standpoint of economics and process control, highly suitabel polymers can be prepared by a method in which the monomer reactants are suspended in water. Other variations upon the polymerization method may also be utilized in order to vary the properties of the product, one example of which is polymerization at relatively high temperatures which normally produces polymers having low shear characteristics. Highly fluid resins can also be prepared by utilizing a technique in which the monomer charge or a portion thereof is continuously fed to the reaction vessel, which is believed to promote branching.

However, the graft copolymers may also be used advantageously with interpolymers formed of monovinylidene aromatic hydrocarbon monomers and polar monomers. The monovinylidene aromatic hydrocarbons have already been described in connection with the interpolymers of the graft copolymer. The polar monomers include the unsaturated nitriles and alkyl alkacrylates which have also been described in connection therewith. Other polar monomers which may be interpolymerized with the monovinylidene aromatic hydrocarbon monomers are alpha, beta- unsaturated monobasic acids and dervatives thereof, e.g., acrylic acid, methyl acrylate, ethyl acrylate, butyl acrylate, 2-ethylhexyl acrylate, methacrylic acid, ethacrylic acid (corresponding esters of the alkacrylic acids constitute the alkyl alkacrylates); acrylamide, methacrylamide; dialkyl maleates or fumarates such as dimethyl maleate, diethyl maleate, dibutyl maleate, the corresponding fumarates, etc. Mixtures of the polar monomers may also be employed, and the amount of these comonomers which may be included in the interpolymer will vary as the result of various factors.

The monovinylidene aromatic hydrocarbon interpolymers contain at least 10 percent by weight of the monovinyidene aromatic monomer and preferably at least 35 percent by weight thereof. They also contain at least 20 percent by weight of the polar monomer and preferably at least 30 percent by weight thereof. In addition, they may contain up to 15 percent by weight of other ethylenically unsaturated copolymerizable monomers. Of the various interpolymers, those preferred contain 30 to 80 percent, and preferably 45 to 70 percent, by weight of the monovinylidene aromatic hydrocarbon and 70 to 20 percent, and preferably 55 to 30 percent, by weight of an unsaturated nitrile. By proper selection of the ratio of the monomers in the interpolymers of the matrix and the graft copolymer, a substantially transparent composition can be obtained which exhibits a high degree of impact resistance and chemical resistance.

When a transparent composition is sought, the matrix polymer should in and of itself be transparent but it need not be water clear. Although the matrix polymer may be prepared by any suitable polymerization technique including mass, suspension and emulsion process, the preferred process for producing the matrix polymer utilizes mass polymerization technology in order to obtain optimum clarity. Emulsion polymerization tends to introduce coloring impurities in the polymer by reason of the salts used for coagulation, the emulsifying agents, etc. The refractive index of the matrix interpolymer may be determined by the usual test methods or by reference to published literature. If so desired, graphic representations of the various matrix polymers may be utilized in determining the matrix interpolymer for use with a given graft copolymer, or vice versa.

Other components

Various other optional materials may be added to the compositions of the present invention depending upon the intended use and nature thereof such as, for example, plasticizers, stabilizers, antioxidants, lubricants, processing aids and fillers. The amount and nature thereof will determine the possible effect upon the transparency of the blends. Generally, it is necessary to incorporate stabilizers and antioxidants to prevent degradation of the graft copolymer and oftentimes the matrix polymers. Although the stabilizers and antioxidants may be incorporated at the time of blending of the components into the final polyblend, generally it is most advantageous to incorporate these materials into the individual components after they are formed so as to minimize the tendency for degradation or oxidation during processing and storage.

Formation of the polymer blends

The final polymer blends may be prepared by admixing the components thereof in any of the customary ways including mill rolling, extrusion blending etc. Where the matrix polymer is prepared by an emulsion polymerization process, the latex thereof may be admixed with the latex of the polymerization graft component and the mixed latex spray dried or coagulated, washed and dried.

Generally, the polymer blends may contain 2 to 20 percent by weight of rubber provided by the rubber substrate of the graft copolymer and the preferred compositions will normally contain about 5 to 15 percent. The polymer blends produced in accordance with the present invention may be substantially transparent, i.e., the transmittance through a molded specimen of 0.05 inch in thickness at 500 millimicrons wave length is at least 70 percent and generally considerably greater. To achieve this result, the refractive indices of the graft copolymer and matrix polymer must be closely matched, and the average particle size of the graft copolymer should be less than about 0.4 microns. The transparent compositions may vary from water clear to slightly yellow depending upon rubber components and impurities. Yellowish coloration can be neutralized by incorporation of the appropriate blue dyes. However, the blends do afford significantly advantageous transparency enabling their application to packaging, laminating and other uses where transparency is advantageous and where the remaining balance of properties of the family of blends obviously offers significant advantages.

Exemplary of the efficacy of the present invention are the following specific examples wherein all parts are parts by weight unless otherwise indicated.

Example 1

A latex of a butadiene/styrene rubbery copolymer (70/30) having an average particle size of 0.06 micron is subjected to agglomeration by acidulation to increase the average particle size to about 0.206 micron. After agglomeration, the pH of the latex is adjusted to 8.8 and water is added to reduce the solids content to 20 percent.

In a reactor 500 parts of the rubber latex are heated under nitrogen with agitation to about 60° centigrade, after which is added an aqueous solution containing 0.3 part of sodium formaldehyde sulfoxylate. To this emulsion is continuously added over a one-hour period a mixture of 50 parts styrene, 50 parts methyl methacrylate, 0.5 part ethylene glycol dimethacrylate and 0.8 part of a 50 percent solution of di-isopropyl benzene hydroperoxide in benzene. Stirring is continued during the addition of the monomer mixture and is continued for an additional period of one hour thereafter.

Subsequent to this period, a solution of one part of sodium lauryl sulfate in 10 parts water is added to the latex. Continuous addition is commenced of a mixture of 35 parts styrene, 15 parts acrylonitrile and 0.25 part t-dodecyl mercaptan. This monomer formulation is added over a period of about one-half hour, and an aqueous solution of potassium persulfate is added at a rate sufficient to maintain a temperature differential of about 2 to 3 degrees centigrade between the cooling jacket temperature and the temperature of the polymerizing latex.

After a total time of about three hours from the first introduction of the styrene/methyl methacrylate mixture, the latex is cooled to 25° centigrade and a magnesium sulfate solution is added to effect coagulation thereof. Prior to coagulation, one part of 2–6 ditertiary butyl p-cresol is added as an anti-oxidant and stabilizer. The coagulum is filtered, washed with water and dried.

Electron photomicrographs of the grafted rubber particles produced in accordance with this example indicate a particle size range from about 0.232 to about 0.265 micron. The crumb is fused and sheeted on a two-roll at 160° centigrade. Thereafter, test specimens are compression molded at 175° centigrade and 5000 p.s.i. for ten minutes. The physical and mechanical properties of the test specimens are determined as follows:

Tensile stress, p.s.i.:
  At yield (10% strain/minute) _____ 1865
  At failure (200% strain/minute) _____ 3050
Percent elongation:
  At yield _____ 3.6
  At failure _____ 240
Tensile modulus, p.s.i.×$10^5$ _____ 0.94
Percent haze (25 mil at 550 m$\mu$) _____ 9.4
Refractive index, $n_D^{25}$ _____ 1.5448

Example 2

For comparison, a graft copolymer is prepared wherein the superstrate is of substantially uniform composition throughout. In this test, the procedure of Example 1 is substantially repeated. However, to the 500 parts of the rubber latex is added continuously over a ninety-minute period a mixture of 85 parts styrene, 15 parts acrylonitrile, 50 parts methyl methacrylate and 0.6 parts of di-isopropyl benzene hydroperoxide. The polymerizing latex is stirred at 65° centigrade for one and one-half hours after monomer addition has been completed, and the graft copolymer is recovered as in Example 1. The crumb is sheeted and molded into test specimens as indicated in Example 1, and the physical and mechanical properties are determined as follows:

Tensile stress, p.s.i.:
  At yield (10% strain/minute) _____ 1800
  At failure (200% strain/minute) _____ 3020
Percent elongation:
  At yield _____ 3.42
  At failure _____ 226
Tensile modulus, p.s.i.×$10^5$ _____ 0.96
Percent haze (25 mil at 550 m$\mu$) _____ 10.2
Refractive index, $n_D^{25}$ _____ 1.5443

Example 3

Vinyl chloride blends are made containing varying percentages by weight of the graft copolymers produced in accordance with Examples 1 and 2. The vinyl chloride utilized for these blends is a suspension homopolymer containing two parts dibutyl tin mercaptide heat stabilizer per 100 parts of resin and 1.5 parts of a wax lubricant per 100 parts of resin. The vinyl chloride polymer and graft copolymer are milled on a two-roll mill for five minutes at 175° centigrade and test specimens are prepared by compression molding at 180° centigrade under 5000 p.s.i. pressure for ten minutes.

Optical properties are determined in accordance with ASTM Test D1003–52 and impact properties are determined in accordance with ASTM Test D256–56. The results with respect to the several blends are set forth in the table below:

|  | Graft copolymer Example 1 | | | Graft copolymer Example 2 | | |
|---|---|---|---|---|---|---|
| Percent graft copolymer in blend | 8 | 10 | 12 | 8 | 10 | 12 |
| Izod impact strength, ft. lbs./in. notch | 2.9 | 21.3 | 22.4 | 1.7 | 14.7 | 17.3 |
| Percent haze, 25 mils at 550 m$\mu$ | 0.4 | 0.4 | 0.5 | 1.9 | 2.4 | 2.8 |

As can be seen from the results reported in the foregoing table, the blends prepared by use of the graft copolymer of the present invention offer significantly improved properties both in transparency as shown by relatively low haze and in impact strength.

Example 3

Part A.—The rubber latex of Example 1 is agglomerated to a particle size of about 0.182 micron as determined by turbidity measurement. Electron photomicrographs indicate a relatively narrow particle size distribution from 0.16 to 0.20 micron. Sodium lauryl sulfate is added in the amount of 0.3 percent by weight of solids and morpholine is added to adjust the pH to 9.3. The latex is then diluted with water to 20 percent solids.

To 500 parts of the latex heated at 60° centigrade under nitrogen are added 0.3 part sodium hydrosulfite and trace quantities of ferrous sulfate and ethylenediamine tetraacetic acid di-sodium salt. Continuous addition is then commenced of a mixture of 25 parts styrene, 25 parts methyl methacrylate and 0.2 part cumene hydroperoxide over a period of forty-five minutes. Agitation is continued for thirty minutes thereafter at 60° centigrade, and then there is added continuously a mixture of 35 parts styrene, 15 parts acrylonitrile and 0.2 part cumene hydroperoxide over a forty-five minute period. The latex is maintained with stirring at 60° centigrade for one hour after the termination of the monomer addition. After cooling, two parts of an anti-oxidant mixture (1 part 2,6-ditertiary butyl p-cresol:2 parts tris-nonyl phenyl phosphite) are added to the latex, which is then coagulated with a solution of calcium chloride at 85° centigrade to obtain a fine granular product which is washed and dried.

Part B. The procedure of Part A is substantially repeated except that a mixture of 60 parts styrene, 15 parts acrylonitrile, 25 parts methyl methacrylate and 0.4 parts cumene hydroperoxide is added continuously over a period of one and one-half hours in place of the two separate additions of the monomer mixtures.

Part C.—The graft copolymers are blended at various concentrations with a master batch of a blend of two different vinyl chloride homopolymers (blend of equal parts resins with DP-920 and DP-1100). In addition, there are included, for each 100 parts of polymer, two parts per 100 parts dibutyltin mercaptide, one part glycerol monostearate and 0.3 part montan wax and two parts of an acrylic processing aid. The powder blends are fused on a two-roll mill at about 170–175° centigrade for five minutes. Haze and Izod impact strengths are determined on compression molded test specimens, and the results of the tests are set forth in the table below:

|  | Graft copolymer Part A | | | Graft copolymer Part B | | |
|---|---|---|---|---|---|---|
| Percent graft copolymer in blend | 8 | 10 | 12 | 8 | 10 | 12 |
| Izod impact strength, ft. lbs./in. notch | 17.8 | 22.5 | 23.6 | 2.4 | 16.2 | 18.5 |
| Percent haze, 25 mils at 550 m$\mu$ | 0.8 | 0.8 | 0.9 | 1.2 | 1.3 | 1.4 |
| Melt viscosity,* poises at 400° F.: | | | | | | |
|   At a shear rate of 100 seconds$^{-1}$ | | 22,500 | | | 23,000 | |
|   At a shear rate of 1000 seconds$^{-1}$ | | 4,500 | | | 5,000 | |

*Using extrusion rheometer.

Again, it can be seen that the blends utilizing graft copolymers prepared in accordance with the present invention evidence significantly improved properties as compared to blends utilizing a graft copolymer having a substrate of substantially uniform composition throughout.

Example 5

A latex of a butadiene/styrene rubbery copolymer (90/10) having an average particle size of about 0.072 micron as determined by turbidity measurement is agglomerated by acidulation to an average particle size of about 0.192 micron as determined by turbidity measurement. The latex is adjusted in pH to about 8.5 and diluted to 25 percent solids.

To 400 parts of the latex are added 0.3 part sodium formaldehyde sulfoxylate and 0.002 part ferrous sulfate ($FeSO_4 \cdot 0.7\ H_2O$). The latex is heated at 60° centigrade under nitrogen and then there is added continuously thereto over a period of one hour a mixture of 60 parts styrene, 40 parts methyl methacrylate and 0.3 part diisopropyl benzene hydroperoxide. After completion of the addition of the monomers, the emulsion is stirred for an additional hour at 60° centigrade. At this point, there is continuously introduced thereinto over a period of about 45 minutes a mixture of 35 parts styrene, 15 parts acrylonitrile, 0.2 part diisopropyl benzene hydroperoxide and 0.2 part sodium formaldehyde sulfoxylate. The emulsion is stirred at 60° centigrade for an additional hour and then is cooled and coagulated to recover a crumb which is washed and dried.

The average particle size after grafting is found to be 0.212 micron. The graft copolymer is fused and sheeted on a two-roll mill at 165° centigrade and then the mechanical and optical properties are determined on test specimens compression molded therefrom.

Refractive index, $n_D^{25}$ _____ 1.5410
Percent haze, 25 mils at 550 m$\mu$ _____ 3.1
Tensile stress, p.s.i.:
 At yield _____ 2160
 At failure _____ 3280
Percent elongation:
 At yield _____ 3.65
 At failure _____ 231

The graft copolymer is then blended with polyvinyl chloride in an amount providing 10 percent by weight of the copolymer in the blend. The physical properties are determined as follows:

At yield (10% strain/minute) _____ 7220
At failure (100% strain/minute) _____ 4710
Percent elongation:
 At yield _____ 4.0
 At failure _____ 34
Tensile modulus:
 p.s.i.$\times 10^5$ _____ 3.9

Polyvinyl chloride blends containing various amounts of the graft copolymer are tested for physical and optical properties and the results thereof are set forth below:

| | | | |
|---|---|---|---|
| Percent graft copolymer in blend_____ | 8 | 10 | 12 |
| Izod impact strength, ft. lbs./in. notch_____ | 18.4 | 22.0 | 23.4 |
| Percent haze, 25 mils at 550 m$\mu$_____ | 1.8 | 2.3 | 2.5 |

Example 6

A graft copolymer is prepared substantially as indicated in Example 1 utilizing 500 parts of a butadiene/styrene latex (90/10) containing 20 percent solids. The first monomer mixture comprises 50 parts styrene and 50 parts methyl methacrylate. The second monomer mixture comprises 49 parts styrene and 21 parts acrylonitrile.

After recovery of the graft copolymer, optical and mechanical properties are determined on compression molded specimens.

Refractive Index, $n_D^{25}$ _____ 1.5420
Tensile stress, p.s.i.:
 At yield _____ 1435
 At failure _____ 2760
Percent elongation:
 At yield _____ 3.54
 At failure _____ 285
Tensile modulus:
 P.s.i.$\times 10^5$ _____ 0.842

A blend is prepared containing 20 parts of the graft copolymer and 80 parts of a styrene/methyl methacrylate suspension copolymer (50/50), and an injection molded disc is compression molded therefrom with a diameter of two inches and a thickness of one-eighth inch. Upon testing, the disc transmits 82.8 percent of the light at 550 m$\mu$ wavelength. The notched impact strength of an injection molded bar is found to be 7.4 foot pounds per inch of notch.

Example 7

A polybutadiene latex containing 100 parts solids and having an average particle size of about 0.16 micron is initially grafted with a mixture containing 10 parts styrene and 90 parts methyl methacrylate. Thereafter, it is grafted with a mixture of 30 parts styrene and 20 parts acrylonitrile, coagulated, washed and dried.

The graft copolymer is blended with a suspension polymerized methacrylonitrile/styrene copolymer (90/10) to provide a material containing 15 percent by weight of the graft copolymer. A compression molded specimen is found to have an Izod impact strength of 2.5 foot pounds per inch of notch, and a test specimen of 25 mils in thickness exhibits a haze value of 1.4 percent at 550 m$\mu$ wave length.

Example 8

A graft copolymer having a butadiene/styrene substrate (70/30) is prepared by grafting a latex containing 100 parts of the rubbery polymer with 40 parts of a styrene/methyl methacrylate mixture (60/35) and 140 parts of a styrene/acrylonitrile mixture (70/30). The resulting latex is blended with a latex of a styrene/acrylonitrile/methyl methacrylate terpolymer (60/30/10) so as to provide a graft copolymer in an amount comprising about 23 percent by weight of the solids content of the combined latex. The mixed latex is spray dried and the resulting powder blend is compounded by extrusion into pellets which are further extruded into a clear, transparent sheet having a refractive index of 1.558. In a falling dart drop test (one inch tip) at a drop height of two feet indicated a ductile failure pattern and a strength of 0.15 foot pounds/mil.

Thus, it can be seen from the foregoing detailed specification and examples that the present invention provides a novel graft copolymer on polymerization blend having highly desirable properties. The polymerization blend may be utilized per se as a rubbery material or diluted with an interpolymeric matrix similar in composition to the superstrate to provide an ABS-type material for various application. The graft copolymer is particularly useful as an impact modified for matrix polymers of relatively polar character such as the vinyl halide polymers and particularly polyvinyl chloride and copolymers thereof. The graft copolymer may be so formulated as to have an apparent refractive index closely approximating that of the matrix polymer so as to provide not only highly desirable impact resistance and other beneficial physical properties but also optical properties including a high degree of transparency. Thus, the present invention may be utilized to produce materials which are particularly advantageously employed in packaging and other applications by reason of the desirable impact and physical properties. Since the blends may be made transparent, they find particularly beneficial use in the manufacture of bottles, sheet and other packaging forms where the product is to be displayed.

What is claimed is:

1. In the method of making vinyl halide polymer blends, the steps comprising: forming an aqueous mixture of a diene rubber substrate and a polymerizable monomer formulation, said diene rubber substrate consisting essentially of 65 to 100 weight percent of a diene selected from the group consisting of butadiene and isoprene and up to 35 weight percent of a monomer selected from the group consisting of unsaturated aliphatic nitriles, unsaturated aliphatic carboxylates and monovinylidene aromatic hydrocarbons and having average particle sizes ranging from about 0.01 to 10.0 microns, and said first polymerizable monomer formulation consisting essentially of from 40 to 75 weight percent of monovinylidene aromatic hydrocarbon and from 25 to 60 weight percent of alkyl alkacrylate having from 1 to 15 carbon atoms per molecule; subjecting said admixture to polymerization conditions to effect interpolymerization of the monomers and grafting of at least a substantial portion of the interpolymer formed onto said diene rubber substrate to form a graft copolymer; forming an admixture of said graft copolymer and a second polymerizable monomer formulation consisting essentially of from 60 to 85 weight percent of monovinylidene aromatic hydrocarbon and from 15 to 40 weight percent of unsaturated aliphatic nitrile; subjecting said second mentioned admixture to polymerization conditions to effect interpolymerization of the monomers and produce grafting of at least a substantial portion of the interpolymer formed onto said graft copolymer to form a composite graft copolymer having a shell relatively rich in the interpolymer formed by said monovinylidene aromatic hydrocarbon and unsaturated nitrile, said composite graft copolymer having a ratio of graft interpolymers to said diene rubber substrate of from 0.5 to 2.0 parts by weight of combined interpolymers per part by weight of said diene rubber substrate and further having a weight ratio of nitrile interpolymer to alkacrylate interpolymer of from 0.3 to 2.0:1.0 and blending said composite graft copolymer with a vinyl halide polymer to produce a compatible blend thereof having desirable impact properties, said vinyl halide polymer being selected from the group consisting of polyvinyl chloride, and vinyl chloride copolymers with up to 25 weight percent of another ethylenically unsaturated comonomer polymerizable therewith, said blend containing from 2 to 20 weight percent of said diene rubber substrate.

2. The method as defined in claim 1 wherein said vinyl halide is polyvinyl chloride.

3. The method as defined in claim 1 wherein said composite graft copolymer is present in said blend in an amount sufficient to provide 5 to 15 percent by weight of said diene rubber substrate.

4. The method as defined in claim 1 wherein said composite graft copolymer and said vinyl halide polymer have substantially equivalent refractive indices to provide a substantially transparent blend.

5. The method as defined in claim 1 wherein the ratio of the combined weights of interpolymers grafted onto the rubber substrate and onto the graft copolymer to the weight of the rubber substrate is 0.8 to 1.6:10.

6. The method as defined in claim 1 wherein said first and second-mentioned admixtures are aqueous emulsions containing the polymerizable monomer formulations and the rubber substrate and graft copolymer respectively.

7. The method as defined in claim 6 wherein said monovinylidene aromatic hydrocarbon of said first and second mentioned polymerizable monomer formulation is styrene, wherein said unsaturated nitrile is acrylonitrile and wherein said alkyl alkacrylate is methyl methacrylate.

8. The method as defined in claim 6 wherein said diene rubber substrate is a copolymer of butadiene and 10 to 30 percent by weight styrene having an average particle size of about 0.1 to 0.3 micron.

9. The method as defined in claim 8 wherein said rubber substrate is a copolymer of butadiene and 10 to 30 percent by weight of styrene and an average particle size of about 0.1 to 0.3 micron and wherein the ratio of the combined weights of the interpolymers grafted onto the rubber substrate and the graft copolymer to the weight of the rubber substrate is 0.8–1.6:1.0.

10. The method as defined in claim 9 wherein said polymerization conditions for both said first and second mentioned polymerizable monomer formulations effect substantially complete polymerization of the monomers and grafting of at least the principal portion of the interpolymer being formed.

11. The method as defined in claim 10 wherein said composite graft copolymer and said vinyl halide polymer have substantially equivalent refractive indices to provide a substantially transparent blend.

12. The method as defined in claim 11 wherein said vinyl halide polymer is polyvinyl chloride.

13. A polymer blend comprising a matrix polymer of relatively polar nature comprising a vinyl halide polymer selected from the group consisting of polyvinyl chloride, and vinyl chloride copolymers with up to 25 weight percent of another ethylenically unsaturated comonomer polymerizable therewith and a composite graft copolymer dispersed therein, said graft copolymer having a substrate of a diene rubbery polymer and a superstrate formed by two different interpolymers providing a polarity gradient, the first interpolymer consisting essentially of from 40 to 75 weight percent of monovinylidene aromatic hydrocarbon and from 25 to 60 weight percent of alkyl alkacrylate having from 1 to 15 carbon atoms per molecule and the second interpolymer consisting essentially of from 60 to 85 weight percent of monovinylidene aromatic hydrocarbon and from 15 to 40 weight percent of unsaturated aliphatic nitrile, said second interpolymer providing a shell about said composite graft copolymer of relatively polar character exhibiting good phase adhesion to said matrix polymer, said composite graft copolymer having a ratio of graft interpolymers to said diene rubber substrate of from 0.5 to 2.0 parts by weight of combined interpolymers per part by weight of said diene rubber substrate and further having a weight ratio of nitrile interpolymer to alkacrylate interpolymer of from 0.3 to 2.0:1.0, said diene rubbery polymer substrate comprising 2 to 20 percent by weight of said blend and consisting essentially of 65 to 100 weight percent of a diene selected from the group consisting of butadiene and isoprene and up to 35 weight percent of a monomer selected from the group consisting of unsaturated aliphatic nitriles, unsaturated aliphatic carboxylates and monovinylidene aromatic hydrocarbons and having average particle sizes ranging from about 0.01 to 10.0 microns.

14. The polymer blend of claim 13 wherein said monovinylidene aromatic hydrocarbon of said first and second interpolymers is styrene.

15. The graft copolymer of claim 13 wherein said alkyl alkacrylate is methyl methacrylate and comprises 25 to 60 percent by weight of said first interpolymer.

16. The graft copolymer of claim 13 wherein said unsaturated nitrile is acrylonitrile and comprises 15 to 40 percent by weight of said second interpolymer.

17. The polymer blend of claim 13 wherein said composite graft copolymer has a refractive index substantially equal to the refractive index of said matrix polymer to provide a substantially transparent blend.

18. The blend of claim 13 wherein said matrix polymer is a vinyl chloride polymer and said composite graft copolymer has a refractive index substantially equal to that of said vinyl chloride polymer, said diene rubbery polymer being a polymer of butadiene and 10 to 30 percent by weight of styrene, said first interpolymer being comprised of 45 to 65 percent styrene and 35 to 55 percent methyl methacrylate, said second interpolymer being comprised of 65 to 80 percent by weight styrene and 20 to 35 percent acrylonitrile.

19. The polymer blend of claim 18 wherein the weight ratio of the second interpolymer to the first interpolymer is 0.5–1.2:1.0, and wherein the ratio of the combined weights of said first and second interpolymers to the weight of said rubber substrate is 0.8–1.6:100.

References Cited

UNITED STATES PATENTS

| | | | |
|---|---|---|---|
| 3,074,906 | 1/1963 | Calvert | 260—876 X |
| 3,287,443 | 11/1966 | Saito et al. | 260—880 X |
| 3,288,886 | 11/1966 | Himei et al. | 260—876 |
| 3,336,417 | 8/1967 | Sakuma et al. | 260—876 X |
| 3,515,774 | 6/1970 | Lee | 260—880 |

FOREIGN PATENTS

| | | | |
|---|---|---|---|
| 1,110,963 | 4/1968 | Great Britain | 260—880 |

MURRAY TILLMAN, Primary Examiner

H. ROBERTS, Assistant Examiner

U.S. Cl. X.R.

260—29.7 UP, 878 R, 880 R